United States Patent [19]

Petorella

[11] 4,237,642

[45] Dec. 9, 1980

[54] SAILING TROTLINE

[76] Inventor: John A. Petorella, 702 Marquette Dr., San Antonio, Tex. 78228

[21] Appl. No.: 25,638

[22] Filed: May 8, 1979

[51] Int. Cl.³ .................................................. A01K 97/00
[52] U.S. Cl. ..................................... 43/26.1; 43/27.4; 43/43.13; 114/39
[58] Field of Search ................. 43/4, 4.5, 26.1, 27.4, 43/27.2, 43.13; 114/39, 102; 46/93

[56] References Cited

U.S. PATENT DOCUMENTS

| 270,358 | 1/1883 | Aldrich | 43/43.13 X |
|---|---|---|---|
| 578,248 | 3/1897 | Layne | 43/27.4 |
| 647,703 | 4/1900 | Pool | 114/39 |
| 685,943 | 11/1901 | Pool | 114/39 |
| 2,951,307 | 9/1960 | Joy | 43/27.4 X |
| 3,173,395 | 3/1965 | Laurent | 114/102 X |
| 3,462,870 | 8/1969 | Terilli | 43/27.4 X |
| 3,747,248 | 7/1973 | Baer | 43/43.13 |
| 3,760,762 | 9/1973 | Spongberg | 43/43.13 |

*Primary Examiner*—Nicholas P. Godici
*Attorney, Agent, or Firm*—Gunn & Lee

[57] ABSTRACT

A sailing trotling consisting of a buoyant frame member to which is adjustably secured a sail. The buoyant frame member is designed to project a trotline from an operator to a remote position. A hand-operated or electric-motor-operated windlass is provided for reeling out or reeling in the trotline. The said adjustable means permits a projecting of the trotline selectively, either downward or into a selected partial cross-wind position.

9 Claims, 6 Drawing Figures

SAILING TROTLINE

BACKGROUND OF THE INVENTION

1. Field of the Invention

Various devices have been developed and patented throughout the years to aid to the mobility of the fisherman. The device of this invention is in the category which might well be defined as a sailing trotline. A sail mounted on a float is utilized to propel a trotline carrying numerous hooks to a distance from the shore line or a boat or pier.

2. Description of Prior Art

Various fishing devices designed to utilize the force of the wind have been developed and patented. Among these are: U.S. Pat. No. 3,314,632, to Lewis, describing a fishing kite; U.S. Pat. No. 3,462,870 to Terilli employs a kite with a series of hooks suspended from the kite line with the nearest reference, to the best of the knowledge of your applicant, being U.S. Pat. No. 3,747,248, to Baer, which employs a miniature barge-like structure having a sail member attached thereto which extends a line from a point and is capable of moving the extended line from side to side. The device of this invention differs from the prior art in the components and method of construction. The device of this invention employs a PVC frame to which is attached floats. A sail frame projects upward from the PVC frame. The sail frame is controlled by guy lines secured to the frame at the top of the sail and an adjustable chain harness at the bottom extremity of the sail which facilitates a maneuvering or mobility of the float sail structure as desired by various adjustments to the guy lines or the chain harness.

SUMMARY OF THE INVENTION

The device of this invention is constructed from light, PVC pipe utilizing jam fits or sleeve-like connections. To assemble the various components prior to use, T connectors, cross connectors, elbows, and cap-like structures are employed in PVC frame. The sail may be constructed of any desired fabric or sheet of plastic. The guy lines extending to the top of the sail could be constructed from a nylon line or stainless steel. The floats adding buoyancy to the PVC frame are preferably of cylindrical Styrofoam closed-cell material. The forward end of the PVC frame is provided with a stanchion to which is secured the guy lines, the chain harness, and the trotline. The trotline extends from the float sail structure to a shore windlass, which may be either hand cranked or powered by an electric motor and gear train. A series of drop lines and hooks are spaced along the trotline. Preferably, the trotline would also include a series of bobbers attached to help trotline to stay afloat. These bobbers may well be brightly colored to warn boats or water skiers. The device of this invention lends itself to extending the trotline a substantial distance from a pier, boat, or a shore line if the prevailing wind is in the desired direction. The adjustable guy lines and chain harness of this invention permit a projection of the sail float structure in various desired directions other than directly downwind. The prototype of this invention has been tested and utilized with amazingly successful results. The poundage of fish caught in the use obtained enviable results.

BRIEF DESCRIPTION OF THE DRAWINGS

For an illustration of this invention and the following detailed description illustrating the method of construction of the device in two embodiments and the operation or utilization of the invention, reference is made to the attached several views wherein identical reference characters will be utilized to refer to identical or equivalent components throughout the various view and the later detailed description.

DETAILED DESCRIPTION OF THE PREFERRED EMBODIMENT

Figure 5:
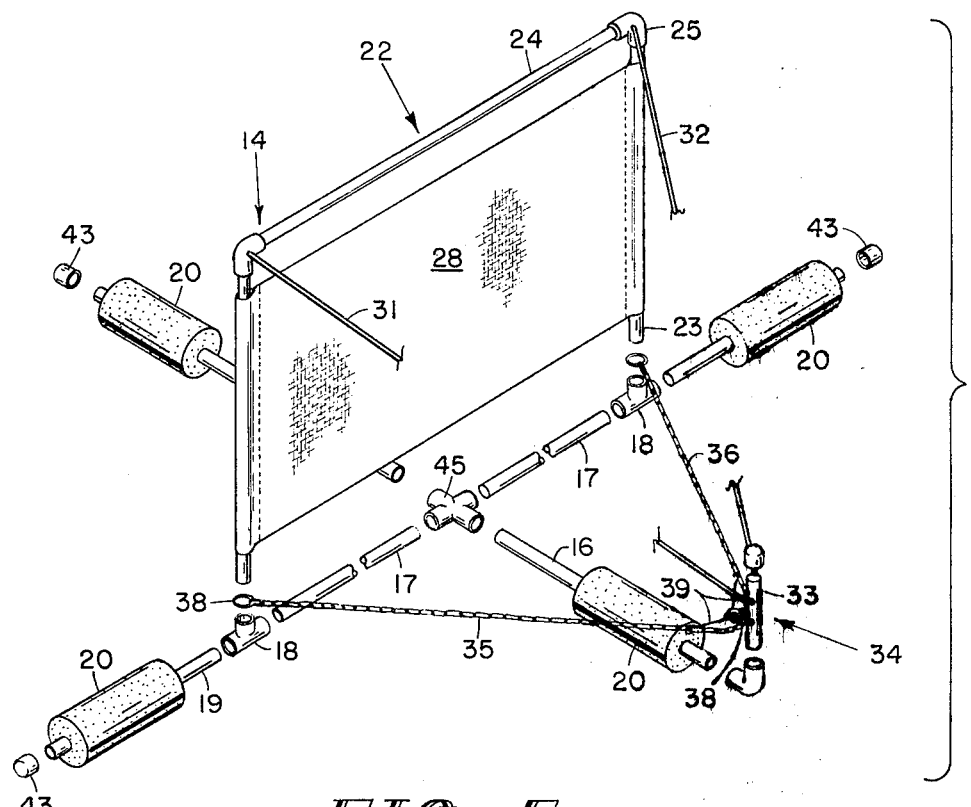
FIG. 5 is an exploded view of the PVC frame and sail indicating the details of construction and suggested assembly procedures of Species One of the invention.
Figure 6:
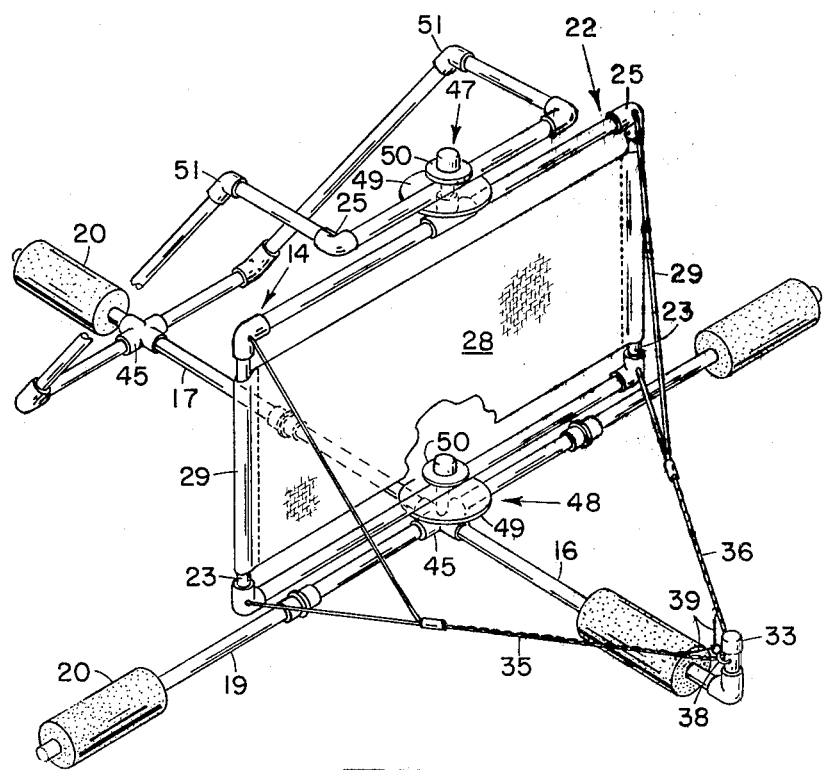
FIG. 6 is a perspective view of Species Two of the invention which is an alternative embodiment utilizing a modified chain harness means employing an upper swivel and a lower swivel from which is supported rotatably a sail frame.

For the detailed description of the construction and operation of the device of this invention, reference is made to the various drawings. FIG. 5 illustrates Species One of the invention. Numerous adjustable positions are provided for positioning the sail in Species Two of the invention. FIG. 6 illustrates a more flexible maneuvering of the sail float combination.

Figure 1:
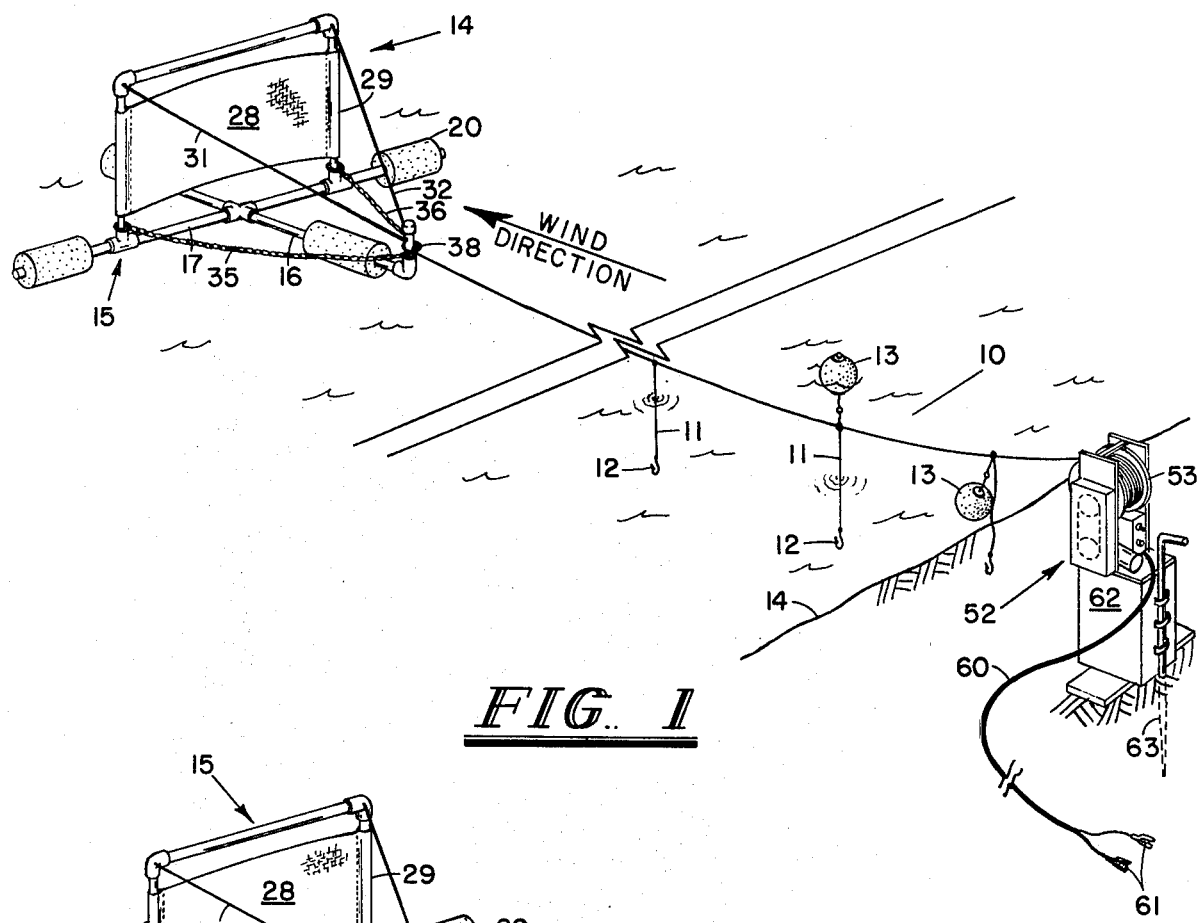
FIG. 1 is a perspective view illustrating the device anchored to a shore line and the sail float structure extending offshore.
Figure 2:
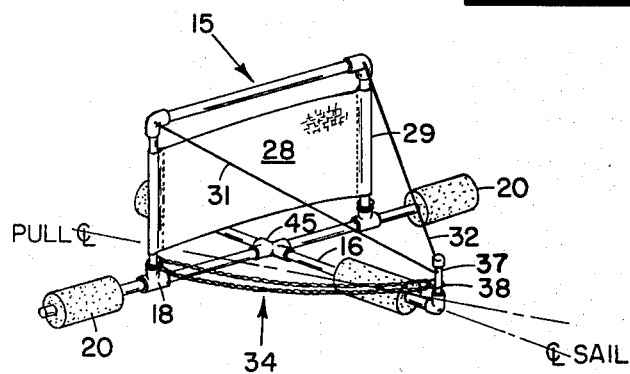
FIG. 2 is a fragmented view indicating some of the details of the float sail structure together with the guy lines and the chain harness.

The trotline 10 of FIG. 1 is of conventional construction consisting of a heavy trotline 10, hook line 11, hooks 12, and a series of bobbers 13. To propel the line 10 from the shore, boat, or pier, a float sail structure 14 is utilized. Float sail 14 is constructed utilizing a PVC frame 15. Plastic pipe employed is preferably lightweight and waterproof, having a diameter of approximately one inch; however, the size of the pipe employed and the lengths of the various components are relatively optional. In the preferred embodiment, an extension member 16 was utilized in both Species One and Species Two as illustrated in FIGS. 5 and 6. An elongated, cross frame 17 is also employed in both species. In Species One of the invention, as illustrated in FIGS. 1, 2 and 5, two T joints 18 are positioned in the cross frame 17. Projecting outward from these T joints 18 at each end of cross frame 17 are float extensions 19 to which are secured Styrofoam floats 20. Any buoyant material might be used for constructing these floats 20; however, it is visualized that a closed-cell, expanded plastic having high buoyancy qualities, such as Styrofoam, would be the preferable method of construction. A sail frame 22 is attached to cross frame 17 in the T joints 18. Side members of sail frame 22 are elongated, tubular sections of PVC, illustrated as upright extensions 23. Completing sail frame 22 is a top cross member 24 which is attached to the upright extensions 23 by means of two elbow joints 25. In view of the fact the device of this invention is to be utilized frequently in salt water and in areas of sandy beach, it is preferable that all joint connections be unthreaded telescopic slip fit joints retained by wedge or friction contact only. It is visualized that the device of this invention may be disassembled and reassembled at the point of next use. Secured to sail frame 22 is a fabric sail 28. This fabric may be of any desired construction; however, a plastic or a nylon-coated plastic fabric would be preferable. The sail 28 is constructed with sail sleeves 29 at each extremity. The sail sleeves 29 slide over the upright extensions 23 and retain the sail 28 in position. In the embodiment of the invention of Species One of FIGS. 1, 2 and 5, the first guy line 31 and the second guy line 32 project from the top edge of the sail frame 22. These guy lines 31 and 32 extend from cross member 24 to the forward end of extension member 16. In the preferred embodiment, these guy lines were slidably or movably attached to stanchion 33. Connecting the lower extremity of sail frame 22 to stanchion 33 is a chain harness 34. This structure varies somewhat in its configuration in Species One, FIG. 5, and Species Two, FIG. 6. In each embodiment, however, there is utilized a first chain 35 and a second chain 36 which are adjustably attached to stanchion 33. The guy lines 31 and 32 are movably or slidably attached to stanchion 33 by means of a sliding contact through stanchion 33 or some type of block or pulley. Regardless of the detail of the construction attaching guy lines 31 and 32 to the stanchion 33, this structure functions as a guy runner 37. Chain harness 34 is attached to sail frame 22 by means of a chain anchor 38. This structure may comprise a ring attached to the end of the chain which is of sufficient size to fit around the upright extension 43 adjacent T joint 18. Unlike the guy runner 37 connection for the guy lines 31 and 32, chain harness 34 must be fixedly secured to stanchion 33 in a selected position. This may be accomplished by a chain adjusting clip 39, as illustrated in FIGS. 5 and 6, or some other suitable attaching means. The floats 20 could be securely attached to segments of the extension member 16 or cross frame 17 or they might be slidably affixed to these members and retained in position by float retainers 43, which might be cap covers. At the center of cross frame 17 is positioned cross joint 45 which connects extension member 16 and cross frame into an integral structure.

Species One of the invention is illustrated in FIG. 5. In Species One of the invention, the positioning of the sail 28 at an angle to the wind is accomplished by the releasing of the chain harness 34 from one of the upright extensions 23. When this is accomplished, the force of the wind will cause a shift of the guy lines 31 and 32 through the guy runner 37 which places the entire float sail structure 14 at an angle to the wind on the extension of trotline 10. This would cause the float sail structure 14 to move at an angle slightly into the wind in a similar manner to a sailboat beating into the wind.

In Species Two of the invention, as illustrated in FIG. 6, this result is accomplished by tilting of the sail frame 22 at an angle to the float sail structure 14. To permit this, as illustrated in FIG. 6, an upper swivel 47 and a lower swivel 48 are provided. This swivel structure utilizes a large, flat lower disk 49 and a smaller upper cap 50. This, in effect, secures sail frame 22 to the structure in a pivoting position. To stabilize the sail frame structure 22 of this species of the invention, some auxiliary bracing is required. This structure is illustrated in FIG. 6, and may be constructed of PVC pipe utilizing elbow joints 25 as employed in the remainder of the structure. This configuration, however, would desirably employ two 45° angle connectors 51 in its construction. The remainder of this construction is illustrated in detail in FIG. 6. It is apparent that in this embodiment a second cross joint 45 would be positioned in the extension member 16 adjacent the rear float 20.

Figure 3:
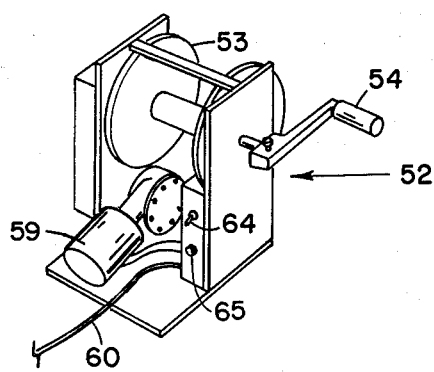
FIG. 3 is a perspective view of the shore windlass suggesting either a hand crank for the windlass or an electrical powered drive for the windlass.
Figure 4:
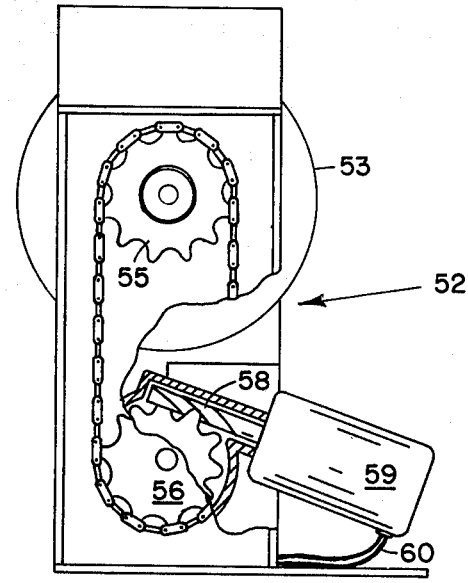
FIG. 4 is a side view partially fragmented of the shore windlass indicating some of the detail of the electric power drive.

For an illustration of a possible shore windlass 52 to be utilized in conjunction with the float sail structure 14 of this invention, reference is particularly made to FIGS. 1, 3, and 4. The shore windlass 52 may be hand driven or electrically driven. One method of operation would be the attaching to the windlass 53 of FIG. 3 a hand crank 54. The electric powered version of this structure is suggested in FIGS. 1, 3, and 4. This structure might employ a windlass sprocket 55 and a drive sprocket 56. Drive sprocket 56 could be mounted on an axle together with a spur gear 57 which interconnects to a worm gear 58 which is rotated by motor 59. In the preferred embodiment, as illustrated in FIG. 1, extension cord 60 is attached to motor 59. The extension cord 60 should be equipped with battery clips 61 which might be attached to battery of a car, boat, or an electric troll motor. The shore windlass 52 would preferably be a composite structure having a windlass base 62 to which is secured motor 59 and windlass 53 with interconnecting structures. As illustrated in FIG. 1, anchor stakes 63 would connect the windlass base 62 to the shore. If the device were utilized on a boat or pier, some other means of connection, such as a "C" clamp or other attaching means, might be employed. As previously mentioned, the device of this invention may be either hand powered or electric powered. To activate or deactivate the electric motor 59, the circuit should be provided with an on-off switch 64 and a 30-amp fuse 65, as illustrated in FIGS. 1 and 3.

OPERATION OF THE DEVICE

In fishing from a shore installation with the prevailing wind blowing offshore, an example of the operation of this device is as illustrated in FIG. 1. The prevailing wind would carry the float sail structure 14 offshore carrying with it the trotline 10 and the series of baited hooks 12. When trotline 10 is at an extended distance, the operator can detect the presence of fish on the line by observing the position of various bobbers 13. With no fish on the line 10, the bobbers 13 would be substantially in a straight line. With the presence of one or more fish attached to the hooks 12, the bobbers 13 form an arched or curved line. It would be permissible to leave the trotline 10 extended in position for a substantial period of time. When it is desired to reel in the line 10 with the fish, hand crank 54 may be utilized or the on-off switch 64 activated reeling the trotline 10 in onto the windlass 53. As desired, the switch 54 might be de-energized to remove fish from hooks 12. To avoid continuous fishing in the same position or to endeavor to reach more productive areas, either the first chain 35 or second chain 36 might be disconnected from one of the upright structures 23 and connected to the opposite structure 23. This shift of the chain harness 34 would cause the float sail structure 14 to move to the left in the configuration illustrated in FIG. 2. If an opposite connection of the chain harness 34 were utilized, the float sail structure 14 would move to the right.

After a desired adjustment is applied to the sail to move the device windward away from a shore to a desired position, should the wind change direction, the sail will not have to be taken in to apply new adjustment for direction. The sail is light and will turn as a wind vane. The fisherman can slack the trotline followed by a tightening and cause the trotline to arc back and move forward with the wind.

In operating the species of the device as illustrated in FIG. 6, corresponding adjustment would cause the device to proceed to the right or the left as desired. In summary, the species of the device in FIG. 6 would move in the direction of that point of the sail 28 nearest the shore, pier, or boat. When the right-hand corner of the sail 28 is retracted toward the trotline 10, the float sail structure 14 proceeds to the right. If the left hand corner is retracted, the float sail structure 14 proceeds to the left.

Having described the construction and operation of the device of this invention in two species, what is desired to be claimed is all embodiments of modification of this invention not departing from the scope of equivalents of the invention as defined in the appended claims.

I claim:
1. A sail trotline comprising:
   a. a buoyant frame means;
   b. a sail adjustably mounted on said buoyant frame means,
   c. guy lines attached to the top portion of said sail,
   d. an adjustable harness attached to the bottom portion of said sail,
   e. adjusting means for attaching said harness to said buoyant frame means, and
   f. a trotline attached to said buoyant frame means, said trotline extending from said buoyant frame means to,
   g. a remote windlass capable of reeling in said trotline.
2. The invention of claim 1 wherein said buoyant frame means comprises:
   a. an extension member to which is secured substantially normal thereto,
   b. a cross member, and
   c. a multiplicity of floats secured to said extension member and said cross member.
3. The invention of claim 1 wherein said buoyant frame is constructed from telescoping components of tubular plastic.
4. The invention of claim 1 wherein said adjustable harness comprises:
   a. a chain harness attached to said buoyant frame by means of,
   b. a chain adjusting clip.
5. The invention of claim 1 wherein said adjusting means comprises:
   a. a stanchion projecting upward from said buoyant frame member, and
   b. said adjustable harness is attached to said stanchion by means of a chain adjusting clip.
6. The invention of claim 1 further comprising anchor stakes securing said windlass to a shore line.
7. The invention of claim 1 wherein said windlass is driven by a crank.
8. The invention of claim 1 wherein said windlass is driven by an electric motor.
9. The invention of claim 1 further comprising bobbers attached to said trotline.

* * * * *